Jan. 11, 1938.   C. H. OSHEI   2,105,259
ACCESSORY AIR PUMP FOR MOTOR VEHICLES
Filed April 24, 1935   2 Sheets-Sheet 1

*INVENTOR*
CHARLES H. OSHEI
BY
*ATTORNEYS*

Jan. 11, 1938.    C. H. OSHEI    2,105,259
ACCESSORY AIR PUMP FOR MOTOR VEHICLES
Filed April 24, 1935    2 Sheets-Sheet 2

INVENTOR
CHARLES H. OSHEI
BY
Bean Brooks Buckley & Bean
ATTORNEYS

Patented Jan. 11, 1938

2,105,259

UNITED STATES PATENT OFFICE 2,105,259

ACCESSORY AIR PUMP FOR MOTOR VEHICLES

Charles H. Oshei, Detroit, Mich.

Application April 24, 1935, Serial No. 18,034

12 Claims. (Cl. 60—60)

This invention relates to a motor vehicle and primarily to means for providing fluid pressure for the operation of pressure actuated devices accessory and adjunctive thereto.

The present day motor vehicle is equipped with one or more accessories which are operated by fluid pressure, both positive as well as negative. The principal accessory is the well known windshield cleaner which is largely operated by the suction influence from the intake manifold of the internal combustion engine. Such source of pressure is variable in its supply and consequently causes wide variation in the operation of the accessory. Attempts have been made to supplement or replace the manifold as a source of pressure influence, as by means of pumps operated from the engine cam shaft. The pump however is reciprocated at a high speed and, because of its failure to stand up under the strain, has proved inefficient as a satisfactory source of fluid supply. Furthermore, such substitutions have been in the nature of accessories and were not built into the fabrication of the power plant as a unitary and stable part thereof.

The present invention has for its object to incorporate in the motor vehicle make-up a satisfactory source of pressure which is efficient and durable in operation. It further has for its object to combine with the power transmission mechanism of the vehicle, cooperative means for utilizing intermeshing gears, thereof, while operating in their normal function, as a pressure generator to serve additionally as a reliable source of pressure for the operation of pressure actuated accessories and adjuncts. A further object of the invention is to provide a pump adaptor which may readily be inserted in a power transmission gear unit of the present day motor vehicle to convert the transmission gears therein into air displacing elements without interference with their normal functioning as power transmitting elements and without necessitating any change in the formation of the gears or the construction and configuration of the gear housing, either externally or internally.

Figure 1:
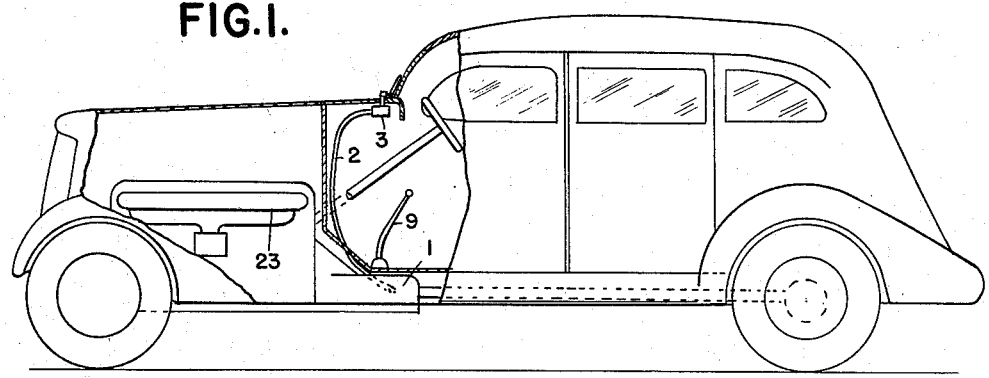
Fig. 1 is a diagrammatical view of a motor vehicle embodying the present invention.
Figure 4:
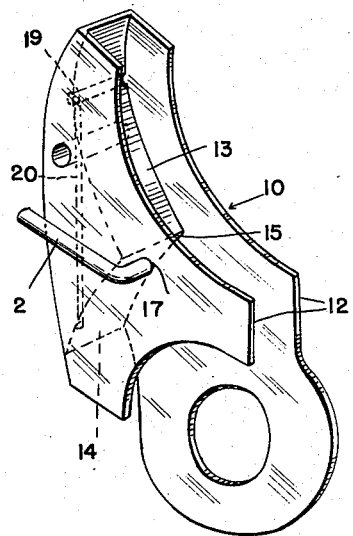
Fig. 4 is a detailed perspective view of a removable suction generator adaptor.

Referring more particularly to the drawings, the numeral 1 designates generally a case or housing for enclosing intermeshing gears in the power transmission line of the motor vehicle drive. Preferably the case encloses the speed changing gears which cooperate in a manner herein set forth to provide a source of pressure which is connected by a conduit 2 to the motor 3 of an accessory, such as a windshield cleaner.

The speed changing transmission embodies the engine driven shaft 4, the direct drive shaft 5 and the counter-shaft 6, the shafts 5 and 6 being connected by two intermeshing gears 7 and 8 which are in constant mesh with each other. By means of the gear shift lever 9, the several other gears within the case may be brought into proper relation to obtain the desired change in speed in the usual manner. The counter-shaft 6 is usually disposed in the lower portion of the case and has its gears operating in a bath of heavy oil or lubricant, and consequently the teeth of the intermeshing gears are maintained well lubricated.

In accordance with the present invention, means are associated and combined with the two gears 7 and 8 to adapt them as pump elements and provide a source of pressure which may be used for the operation of pressure actuated devices. To this end, a pressure chamber 10 is brought into association with these gears so as to enclose the peripheral portions of said gears adjacent and about their point of mesh indicated at 11. In my preferred form I make this pressure chamber removable in character and enable the insertion of the same into the transmission case or housing without necessitating any change or distortion of the gears or the configuration of the housing so that the adaptor or pressure chamber may be introduced into the transmission housing of the present day motor vehicle as a unit. The side walls 12 of this chamber fit closely the opposite sides of the gears, the slight clearance, which is there provided in practice, being sealed against air leakage by the lubricant. Intermediate the side walls are transverse connecting walls 13 and 14 which together with the side walls serve to confine the teeth of the two gears adjacent their point of mesh. These walls are substantially concentric with the gears 7 and 8 respectively and along with the side walls extend a desired distance away from the intermeshing point 11 sufficient to effectively displace the air from the compartment 16. This compartment is defined by the side walls 12 between the point of mesh and the two curved transverse walls 13 and 14 which converge to an edge indicated at 15, in proximity to but short of the point of mesh 11. This construction provides a low pressure compartment which is divided by the edge 15 as the teeth of the two gears move out of mesh. Because of the lubricant-sealed point of mesh 11 and the lubricant-sealed clearance between the gears and their confining walls 12, 13, and 14, the pressure or vacuum condition in the compartment 16 is maximum for a given speed. This pressure compartment is provided with a take-off port 17 by which the low pressure influence may be transmitted through conduit 2 for the actuation of one or more pressure operated accessories. Since gear 8 is operating in the lubricant within the case sump 18 ample liquid will be supplied to the point of mesh and to the marginal portions of the teeth to maintain the desired liquid seal for the utmost efficiency in the generation of the desired pressure within compartment 16.

Figure 3:
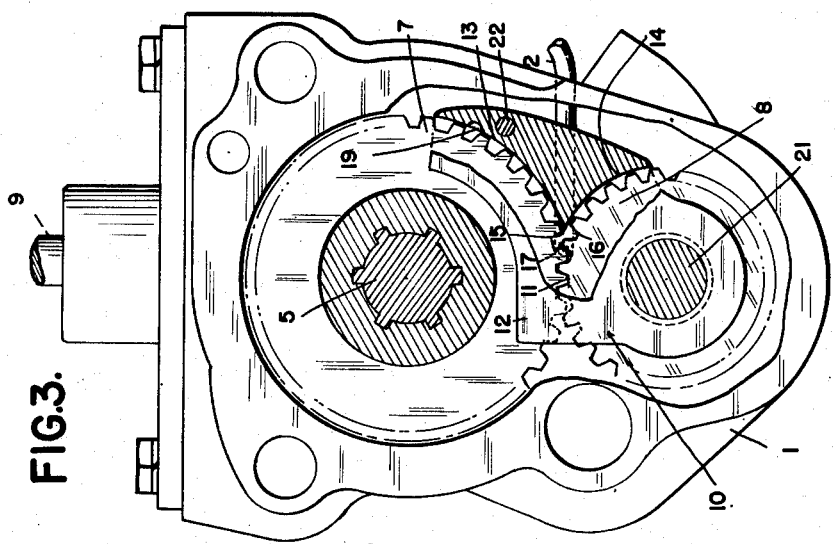
Fig. 3 is a transverse sectional view through the mechanism at right angles to the plane of section of Fig. 2 further depicting the present invention.
Figure 2:
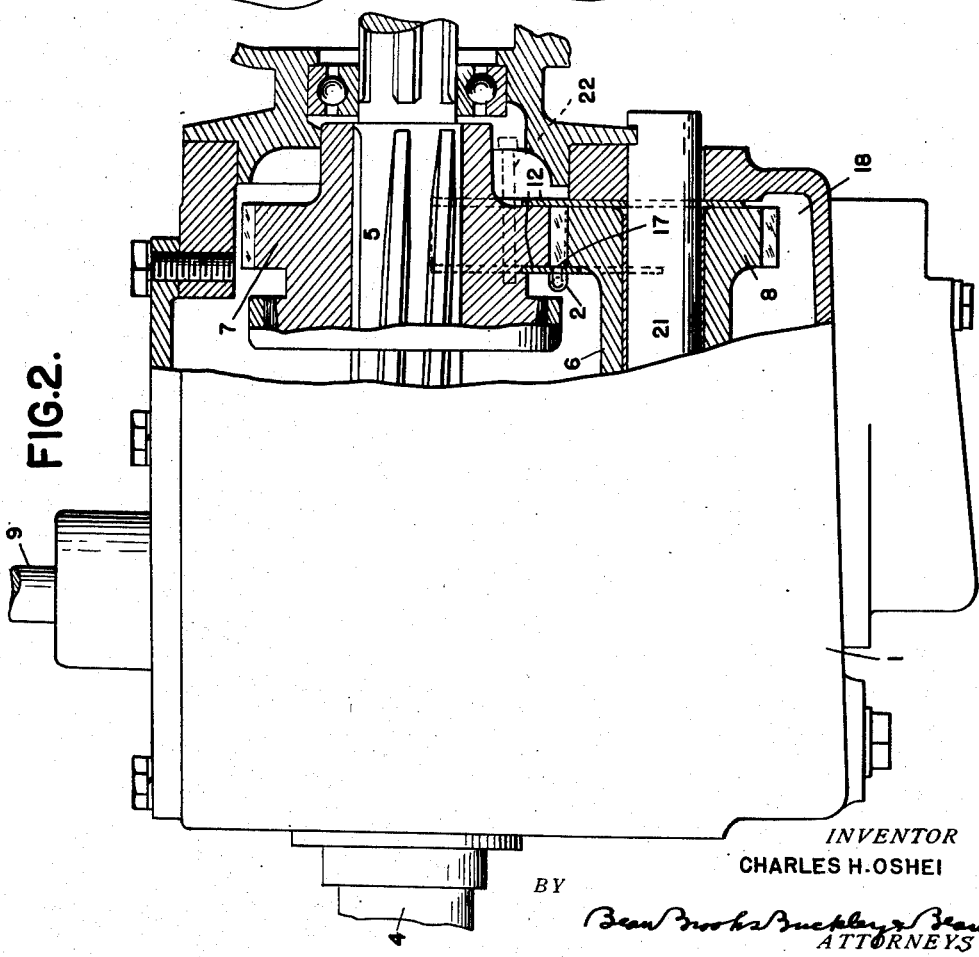
Fig. 2 is an enlarged partial sectional view through the speed changing transmission mechanism embodying the present invention in its preferred form.

From Fig. 3 it will be observed that the transverse walls 13 and 14 extend from the pressure chamber of compartment 16 for a peripheral distance less than and not to exceed 90° from the point of mesh so that the intermediate body portion between the transverse walls will uniformly fit within the diverging series of teeth and will maintain uniform clearance with the teeth as wear occurs.

When the teeth leave the compartment 16 the cavities in between the teeth are at lower pressure than those in the transmission case and therefore air and oil would ordinarily rush in suddenly and cause noise. To avoid this, the clearance between the gear periphery and the confining walls of the adaptor may be gradually increased, or grooves, such as those indicated at 19, may be provided to let the air and the oil enter cavities at relatively low speed.

Figure 6:
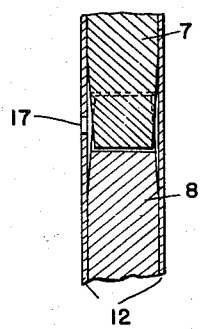
Fig. 6 is a detailed sectional view disclosing the manner in which the gear teeth may be modified, the section being taken approximately through the point of mesh.

The chamber 10 when removable independently of the case, may be supported about the axis of the lower gear 8, such support being obtained through the stationary shaft 21 which supports the counter-shaft 6. This mounting of the chamber insures a concentric disposition of the face or wall 14 with respect to gear 8, the upper end of the chamber being preferably supported on a pin 22 on which the chamber may have slight lateral play to accommodate for any small corresponding lateral displacement in the gears incidental to gear operation. The ear 10' of the removable adaptor chamber may be of any desired formation to facilitate the mounting of the latter in position. In the present construction the lower shaft 21 may be removed to permit such replacement. If desired the intermeshing teeth may be given a slight taper (exaggerated in Fig. 6) to provide a certain amount of clearance or tolerance in more readily accommodating any relative lateral displacement of the gears without impairing the efficiency of the suction generator.

Figure 5:
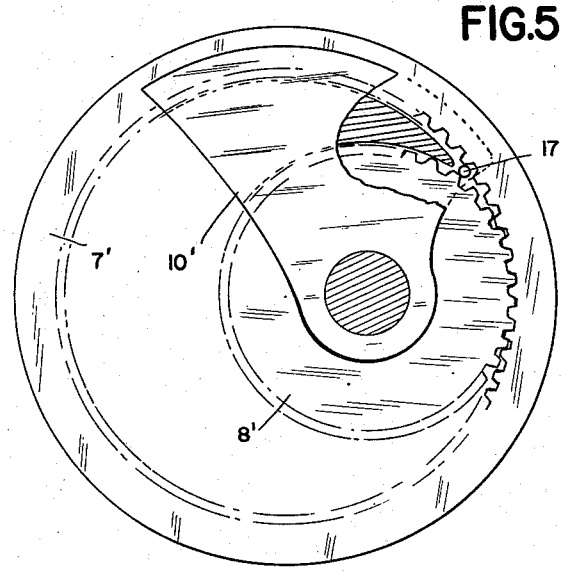
Fig. 5 is a diagrammatical view illustrating the invention as embodied in the internal type of gearing.

The gears 7 and 8 are illustrated as being of the external type but obviously the pressure chamber 10 may be embodied in the internal type of meshing gears, as disclosed in Fig. 5, wherein the chamber is generally indicated by the numeral 10' adjacent the point of mesh between the gears 7' and 8'.

From the foregoing it will be observed that a vacuum or pressure producing unit is embodied in the motor vehicle drive in a manner to combine the normal functioning of the transmission gears with means acting in cooperation with the gears to adapt them and convert them into pump elements, the pump elements of the generator constituting the transmission gears and the sealing operation being performed by the case-contained lubricant. The term pressure is used herein to include either low or high pressure. When operating as a suction pump, the device will operate efficiently at all engine speeds but if desired the conduit 2 may be provided with a branch passage to the intake manifold 23 as an alternate source of suction, suitable valves being provided to have the dominating one of the two sources operate solely and to the exclusion of the companion source of suction. The partial enclosure of the gears 7 and 8 is preferable since this leaves them otherwise exposed for operation in the usual manner and without hinderance from the adaptor chamber. The power transmitting gears may be of any gear unit on the vehicle, those selected for the purpose of illustration being the speed changing gears. The term motor vehicle is inclusive of any motor driven conveyance used for travel over land, on sea, or in air.

The dual functioning of the transmission gears enables the use of the larger transmission gears as pump elements, and while the adaptor is herein disclosed as being removable for ease in assembly it may be made a more permanent part of the case if the engineering specifications so desire.

While the invention has been clearly disclosed so as to present the inventive principles involved it is obvious that the latter may be embodied in other physical forms without departing from the spirit of the invention described and claimed.

I claim:—

1. A motor vehicle having an air operated accessory and a power plant, the latter including intermeshing power transmitting gears enclosed in a casing containing a bath of lubricant in which one of the gears operates, an air pump adaptor chamber disposed in the case and enclosing portions of the gears about their point of mesh in lubricant sealed contact with the enclosed gear teeth to convert the power transmitting gears into an air pump, such chamber having an air port located adjacent the point of mesh, and means connecting the air port to the air operated accessory.

2. In combination, a motor vehicle power plant having intermeshing power transmitting gears operating in an enclosing case containing a bath of lubricant, an air operated accessory for the motor vehicle, a chamber arranged in the case and enclosing portions of the gears adjacent their point of mesh and to one side thereof in the direction of rotation of said gears, the remaining portions of the gears being exposed to the lubricant in the case for operating in their primary capacity as power transmitting members, said chamber having an air port located adjacent the point of mesh, and means for connecting the port to the air operated accessory.

3. The combination with a pair of intermeshing transmission gears of a motor vehicle power plant, an enclosing case for the gears containing a bath of lubricant in which one of the gears operates, and an air operated accessory for the motor vehicle, of an air pump adaptor within the case, said adaptor having a chamber enclosing portions of the gears at and about their point of mesh in lubricant sealed contact with the enclosed gear teeth to convert the transmission gears of the motor vehicle into air displacing members whereby said gears are caused to function in a dual capacity, said chamber having side and transverse walls confining the gear teeth in lubricant sealed relation to provide closed air pockets between the teeth, and an air port for the chamber located adjacent the point of mesh and connected to the air operated accessory whereby during operation of the power plant said transmission gears will constitute a source of power for the actuation of said accessory.

4. In combination, a motor vehicle power plant having intermeshing gears and an enclosing case therefor containing a lubricant, an air operated accessory for the motor vehicle, and means for supplying the necessary air pressure for the actuation of such accessory by and during operation of the power plant, said means comprising an air pump adaptor within the case having a chamber enclosing portions of the gears at and to one side of their point of mesh with respect to the direction of rotation, such chamber having an air port opening thereinto adjacent the point of mesh and connected to said air operated accessory, the chamber having a lower wall extending concentrically with respect to one gear and an upper wall extending concentrically with respect to the companion gear, one of said walls having means adjacent its outer end to allow for the gradual opening of the pockets between the gear teeth as they move from the chamber when air flow between the accessory and the chamber is restricted to a predetermined degree.

5. In combination, a motor vehicle power plant having intermeshing gears and an enclosing case therefor containing a lubricant in which one of said gears operates, an air pump adaptor disposed within the case and enclosing portions of the gears about their point of mesh in lubricant-sealed relation to form closed air pockets between the teeth as they move with respect to the point of mesh, said adaptor having an air port opening thereinto adjacent the point of mesh and adapted for communication with an air operated device, and a pressure operated device so connected, and means supporting said adaptor for movement of portions thereof to accommodate relative lateral movement between the gears.

6. In combination, a motor vehicle power plant having intermeshing power transmitting gears and an enclosing case therefor containing a lubricant in which one of said gears operates, an air pump adaptor chamber disposed within the case and having confining walls enclosing portions of the teeth of the gears at and adjacent their point of mesh, said chamber having a port opening thereinto adjacent the point of mesh for connection to an air actuated device, and means movably supporting the chamber for lateral movement for accommodating bodily play movement between the gears.

7. A motor vehicle having an air operated accessory and a power plant, the latter provided with a pair of intermeshing power transmitting gears operating in a case containing a bath of lubricant, an air pump adaptor chamber removably disposed in the case and having wall portions enclosing the gear teeth about their point of intermesh in lubricant sealed contact, said chamber having an air inlet port and serving to convert the power transmitting gears into air displacing members of the adapted pump, said air inlet port being connected to said air operated accessory for supplying thereto the necessary low pressure influence for the operation of such accessory by and during operation of the power transmitting gears of the motor vehicle power plant, and means supporting the wall portions of the air pump adaptor chamber to accommodate lateral play between the gears.

8. An air pump adaptor for mounting in a lubricant containing gear case of a motor vehicle in association with two intermeshing gears therein for adapting such gears as an air pump for the operation of a motor vehicle accessory, at least one of said gears operating in the lubricant bath, said air pump adaptor comprising side and transverse walls for confining the air pockets between the teeth of both gears with a lubricant seal at and adjacent their point of mesh of the associated gears, and means for mounting the air pump adaptor within the gear case.

9. An adaptor insertable and removable as a unit from the standard transmission case of a motor vehicle shaped and formed to be insertable into said case as a unit to cooperate with the transmission gears therein without changing or distorting said gears and adapted to cause said gears without interference with their normal function to create a source of pressure or induce pressure for the operation of a motor vehicle accessory.

10. An adaptor insertable and removable as a unit from the standard transmission case of a motor vehicle shaped and formed to be insertable into said case as a unit to cooperate with the transmission gears therein without changing or distorting said gears or the external configuration of said case and combining with said gears to produce with said gears a source of pressure or induce pressure for the operation of a motor vehicle accessory.

11. A combined power transmitting and air pump unit for motor vehicle power plants comprising a casing for containing a bath of lubricant, power transmitting gears enclosed within the casing and lubricated by the bath therein, and means enclosing the gears about their point of mesh in lubricant sealed contact with the teeth thereof to convert said gears into air displacing elements, said converting means being provided with an air port opening therein adjacent the point of intermesh of the gear teeth, said air port adapted for connection to an air operated accessory.

12. An air pump adaptor for mounting in a lubricant containing gear case of a motor vehicle in association with two intermeshing gears therein for adapting such gears as an air pump for the operation of a motor vehicle accessory, at least one of said gears operating in the lubricant bath, said air pump adaptor comprising side and transverse walls for confining the air pockets between the teeth of both gears with a lubricant seal at and adjacent their point of mesh of the associated gears, each transverse wall extending from the intermeshing teeth about its respective gear for a peripheral distance to a point not to exceed 90° from the point of mesh, and means for movably mounting the air pump adaptor within the gear case to maintain a substantially uniform clearance between the walls of the adaptor and the gears for being lubricant sealed.

CHARLES H. OSHEI.